United States Patent
Ledger et al.

(10) Patent No.: US 7,395,803 B2
(45) Date of Patent: Jul. 8, 2008

(54) ELECTRIC OIL PUMP SYSTEM AND CONTROLS FOR HYBRID ELECTRIC VEHICLES

(75) Inventors: David Ledger, Dearborn, MI (US); George Dolan, Commerce Township, MI (US); Floyd Cadwell, Dearborn, MI (US); Jeffrey Boismier, Rockwood, MI (US); Jason Konopa, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/556,362

(22) Filed: Nov. 3, 2006

(65) Prior Publication Data

US 2008/0121464 A1    May 29, 2008

(51) Int. Cl.
*F01M 1/00* (2006.01)
(52) U.S. Cl. .................................. 123/196 R
(58) Field of Classification Search ............. 123/196 R, 123/2, 196 S, 196 A
See application file for complete search history.

(56) References Cited

U.S. PATENT DOCUMENTS

| | | | | |
|---|---|---|---|---|
| 4,147,151 A | * | 4/1979 | Wright | 123/198 DC |
| 4,458,644 A | * | 7/1984 | Papst | 123/196 S |
| 4,592,323 A | * | 6/1986 | Vest | 123/362 |
| 4,703,727 A | * | 11/1987 | Cannon | 123/196 S |
| 5,488,935 A | * | 2/1996 | Berry, Jr. | 123/196 S |
| 5,568,842 A | | 10/1996 | Otani | |
| 5,606,946 A | | 3/1997 | Data et al. | |
| 5,655,495 A | * | 8/1997 | Richards | 123/196 S |
| 5,924,395 A | | 7/1999 | Moriya et al. | |
| 6,148,789 A | * | 11/2000 | Johns | 123/196 S |
| 6,350,108 B1 | * | 2/2002 | Haupt | 417/364 |
| 6,453,864 B1 | * | 9/2002 | Downs et al. | 123/179.3 |
| 6,453,865 B2 | | 9/2002 | Hirose et al. | |
| 6,647,326 B2 | | 11/2003 | Nakamori et al. | |
| 6,655,342 B1 | * | 12/2003 | Wendels et al. | 123/196 R |
| 6,692,402 B2 | | 2/2004 | Nakamori et al. | |

(Continued)

FOREIGN PATENT DOCUMENTS

EP    1 216 871    6/2002

(Continued)

OTHER PUBLICATIONS

SAE Technical Paper Series 1999-01-0641, "Ford Zetec-E, 14 Engine Timing Belt Drive", Mar. 1-4, 1999, pp. 1-15.

(Continued)

*Primary Examiner*—Stephen K. Cronin
*Assistant Examiner*—Hyder Ali
(74) *Attorney, Agent, or Firm*—David B. Kelley; Brooks Kushman P.C.

(57) ABSTRACT

An engine lubrication oil flow control system and control method for an engine in a hybrid electric vehicle powertrain is disclosed. An engine lubrication oil pump is powered by a lubrication oil pump motor. Provision is made to start the lubrication pump motor at the initiation of engine cranking upon a transition from an engine-off driving mode to an engine-on driving mode. An engine oil pressure signal is used to indicate engine filter maintenance is needed. The oil pump motor may be powered by a vehicle powertrain traction battery.

15 Claims, 3 Drawing Sheets

U.S. PATENT DOCUMENTS

| | | | |
|---|---|---|---|
| 6,716,009 B2 | 4/2004 | Sowa et al. | |
| 6,941,922 B2 * | 9/2005 | Williams et al. | 123/196 R |
| 7,013,213 B2 | 3/2006 | McGee et al. | |
| 7,055,486 B2 * | 6/2006 | Hoff et al. | 123/196 R |
| 7,117,964 B1 | 10/2006 | Kuang et al. | |
| 2006/0100057 A1 * | 5/2006 | Severinsky et al. | 477/4 |
| 2007/0204816 A1 | 9/2007 | Russell et al. | |
| 2007/0204817 A1 | 9/2007 | Russell et al. | |

FOREIGN PATENT DOCUMENTS

| | | |
|---|---|---|
| JP | 2004069070 | 3/2004 |
| JP | 20070216764 | 8/2007 |

OTHER PUBLICATIONS

Search Report under Section 17(5) for GB0721023.0 dated Jan. 21, 2008.

* cited by examiner

ELECTRIC OIL PUMP SYSTEM AND CONTROLS FOR HYBRID ELECTRIC VEHICLES

BACKGROUND OF THE INVENTION

1. Field of the Invention

The invention relates to a vehicle powertrain having an internal combustion engine with an engine oil lubrication pump powered by an electric motor.

2. Background Art

A hybrid electric vehicle powertrain typically has two electric machines and an internal combustion engine. In one operating mode, the engine and the electric machines define two power flow paths to vehicle traction wheels. One electric machine functions as a generator in one operating and as a motor in another operating mode. Likewise, the other electric machine operates as a motor or as a generator depending upon the operating mode. The electric machines are electrically coupled to a high voltage traction battery.

In a so-called divided power hybrid electric vehicle powertrain, a first power source is established as the engine output power is divided into two paths by controlling the first electric machine, which in this instance would be functioning as a generator. A mechanical power flow path extends from the engine through a gear system to a gearing arrangement, which delivers driving power to the traction wheels of the vehicle. An electrical power flow path extends from the engine to the generator and to the second electric machine, which in this instance would function as a motor. The output torque of the motor is delivered to the traction wheels through the gearing. The engine power is divided by controlling generator speed to effect a so-called positive power split. If the generator functions as a motor, power input to the gearing from the generator will establish a so-called negative power split. The generator in this powertrain configuration can be braked so that the engine can deliver torque through a solely mechanical path as an electric power flow path is established by the motor, which is powered by the battery.

When the powertrain is configured to provide a second power source, the motor alone, using battery power, can provide driving torque to the traction wheels independently of the engine for both forward and reverse operation of the vehicle. The generator alone acting as a motor can propel the vehicle forward using battery power with the engine off.

It is apparent from the foregoing description that the engine must be started or stopped each time the powertrain transitions from one operating mode to another.

The engine, as in the case of conventional powertrain systems, requires a lubrication oil pump, which typically is driven by the engine as lubricating oil is circulated from an engine oil sump through moving components of the engine. It then is drained back to a sump. The oil sump in this configuration is referred to as a wet sump.

An example of an engine with a wet sump may be seen by referring to U.S. Pat. No. 5,606,946 (FIG. 7a). If the engine is provided with a so-called dry sump, the engine driven oil pump must transfer lubricating oil rapidly through the engine from an auxiliary oil reservoir. Such a lubricating oil flow circuit is illustrated, for example, in FIG. 7b of U.S. Pat. No. 5,606,946.

In a hybrid electric vehicle of the type described above, frequent engine stops and starts will reduce fuel consumption, but before each start there is a low oil pressure in the lubrication system. The frequent engine start/stop cycles can increase engine wear due to thin oil films on surfaces between relatively movable elements of the engine, which potentially affects adversely engine life. In a typical hybrid electric vehicle powertrain, the unique duty cycles for the electric machines can vary based on environmental and engine usage profiles. It also is difficult to detect when an oil change in the engine should be made for routine engine maintenance.

SUMMARY OF THE INVENTION

The powertrain configuration of the disclosed embodiment of the invention has an internal combustion engine with a dry oil sump, which is in fluid communication with an engine lubrication oil pump that is driven by an electric motor powered by the powertrain battery under the control of a traction battery control module. The oil pump has a separate oil reservoir located at a convenient location in the powertrain system.

The traction battery control module receives appropriate commands from a vehicle system controller, which in turn responds to input signals, including driver power commands determined by driver-operated accelerator pedal movement, traction battery state-of-charge, the vehicle transmission drive range selected by the operator, and environmental inputs, including engine oil pressure, engine speed, engine oil temperature, engine load, the amount of time the engine is on, and the vehicle exhaust system catalyst temperature. The controller will monitor engine oil filter life as well.

A control algorithm will use vehicle controllers to alert the operator of a need to change an engine oil filter in accordance with a maintenance schedule. This alert is achieved by detecting engine oil pump pressure for a given amount of oil pump driving torque. If the engine oil filter becomes clogged, more electric motor torque is required to overcome flow resistance of the lubrication oil system. At a calibrated maximum motor torque level, which may be calculated from current draw or voltage change, a flag will be set in the vehicle system controller and a warning signal will be sent to an instrument cluster display in the passenger compartment to inform the operator that the oil filter should be changed.

To avoid engine starts when the oil pump pressure is below an optimal value, the strategy of the invention will prime the engine with oil pressure before the initiation of the engine start event. This will avoid engine wear by providing critical oil films during the engine cranking mode.

If the engine has hydraulic valve lash adjusters an undesirable valve ticking noise may develop if the hydraulic lash adjusters are not pressurized at the time of the engine start. The lash adjusters may bleed down and lose oil pressure in their oil reservoirs when the engine is off, especially when the engine has been off for an extended period of time. This condition also is corrected by the strategy of the invention.

The engine oil lubrication system and strategy of the invention does not require the use of a bypass valve, as in the case of conventional engines, during normal high speed engine use. This improves the operating efficiency of the engine since the oil pump is not required to pump against a high output pressure. The strategy of the invention will make it possible to precisely meter oil flow through the engine so that an oil flow bypass circuit is not required for most operating conditions, even at high engine operating speeds.

If the engine includes a variable camshaft timing feature, the engine camshaft can be hydraulically pre-positioned using engine oil pressure before the engine is started. This will further improve engine operating efficiency and reduce the engine cranking time.

Since the oil pressure can be maintained while the engine is off, oil circulation can continue before the engine is cranked and fired. Thus it is possible to maintain the oil temperature at a higher value while the engine is shut down as the oil is circulated through the engine.

The engine oil pump system and strategy of the invention can be applied as well to an engine having a wet sump. A dry sump system, however, unlike a wet sump system, would make it possible to locate the electric motor-driven oil pump and reservoir at the most convenient place in the engine compartment of the vehicle, rather than below the engine cylinders.

The electric motor that powers the lubrication oil pump may be electrically coupled through a relay to the traction battery by a battery control module, which includes a voltage converter. There is no need to use a separate low voltage battery for the pump motor.

The system and strategy of the invention will monitor driver input data and vehicle system input data to determine the instant the engine oil pump motor should be started at the time of a transition from a solely electric drive mode to a drive mode with the engine on. It determines whether oil pump operating temperature is at a calibrated value.

If the engine has a hydraulic variable camshaft timing features, the engine then can be started when the pump lubrication pressure is high. The engine speed is ramped-up and the lubrication oil flow is precisely metered. It may be metered at a high flow value or at a low flow valve, depending on engine load.

PARTICULAR DESCRIPTION OF AN EMBODIMENT OF THE INVENTION

Figure 1:
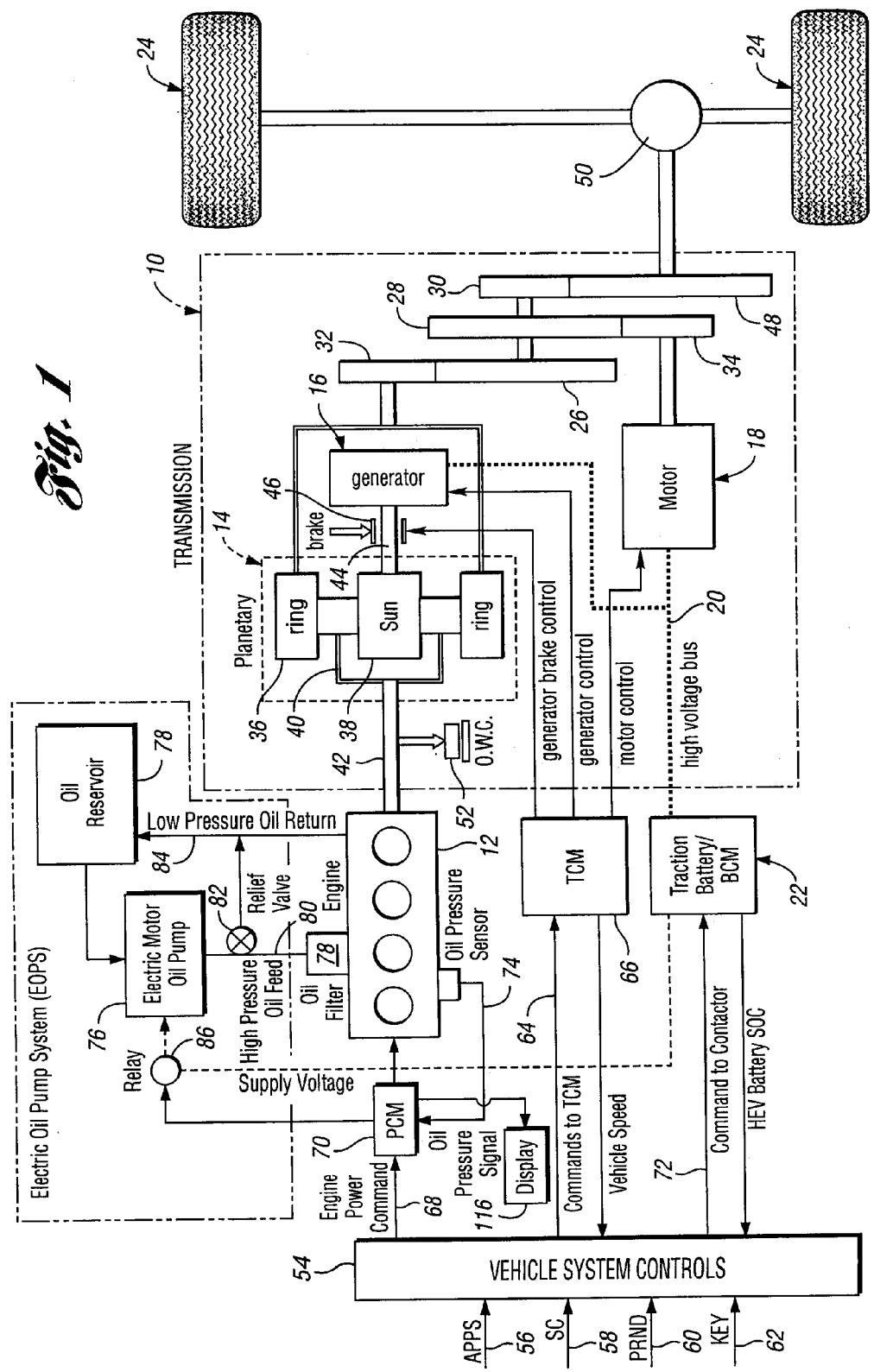
FIG. 1 shows a hybrid electric vehicle powertrain system with divided power flow paths from an engine and a generator-motor subsystem to vehicle traction wheels, the powertrain system including a motor-driven lubrication oil pump with an electric oil pump control embodying the present invention.

A hybrid electric vehicle powertrain with divided power flow paths is illustrated in FIG. 1, but the invention may be adapted for use also in other types of hybrid electric powertrains, including a pure series powertrain in which an engine drives a generator that is electrically coupled to an electric motor and a battery, the power output of the motor being transferred through a multiple ratio transmission to vehicle traction wheels. U.S. Pat. No. 7,117,964 discloses a powertrain with divided power flow paths as well as a pure series hybrid electric vehicle powertrain. The invention can be adapted also for a hybrid electric vehicle powertrain in which the engine and a motor-generator are separately connected to power transmission gearing so that electric power can complement engine power, and wherein an engine power disconnect clutch would be located between the engine and the motor-generator unit.

In FIG. 1, a divided power transmission is generally indicated at 10 and an engine is illustrated at 12. The transmission 10 includes a planetary gear unit 14, an electric generator 16 and a motor 18. The generator and the motor are electrically coupled, as shown at 20, to a traction battery and battery control module 22.

The motor 18 is connected drivably to vehicle traction wheels 24 through gearing, including countershaft gears 26, 28, and 30. Countershaft gear 26 drivably engages planetary power output gear 32. A motor driven gear 34 drivably engages countershaft gear 28.

The planetary gear unit 14 comprises ring gear 36, sun gear 38, and carrier 40, which rotatably supports planetary pinions engageable with ring gear 36 and sun gear 38. Carrier 40 is connected drivably to engine driven shaft 42.

Generator 16 is connected mechanically to sun gear 38 through generator drive shaft 44.

The generator can be braked by selectively engageable brake 46 to establish a purely mechanical power flow path from the engine 12 to the traction wheels through the countershaft gearing and to power output gear 48 drivably connected to the traction wheels through differential and axial assembly 50.

An overrunning coupling or brake 52 will provide a reaction point for the planetary gear unit when generator 16 acts as a power source for delivering power through the planetary gear unit to the traction wheels in a power flow path that is parallel to the power flow path from the motor 18 to the traction wheels.

In a divided power delivery operating mode, engine torque is divided between ring gear torque and sun gear torque. Ring gear torque is delivered to gear 32, which is directly connected to ring gear 36. Sun gear torque drives generator 16, which charges battery 22 when the battery state-of-charge is low. If the battery does not require charging, electrical energy is delivered to the motor, which powers the traction wheels to complement engine power delivered to the traction wheels. Engine speed is controlled by the vehicle system controller and the powertrain control module as they control the generator. The generator acts as a torque reaction for the sun gear 38.

The vehicle system controller is shown at 54. It receives input data, such as accelerator pedal position 56, battery state-of-charge 58, driver selected transmission range signal 60, and an engine ignition "key on" and a "key off" signal 62.

The vehicle system controller acts upon the input data and executes algorithms stored in controller memory to develop output commands, including a transmission control module command 64 for the transmission control module 66, an engine power command at 68 for a powertrain control module 70, and a battery control module contactor command at 72.

The engine has an oil pressure sensor, which issues an oil pressure sensor signal at 74 to the powertrain control module 70.

An electric motor driven oil pump 76 is supplied with lubricating oil from an oil reservoir 78. Electric motor-driven pumps are commonly known. An example is seen in U.S. Pat. No. 6,716,009.

Pump 76 delivers lubricating oil to an engine oil filter 78 through a high pressure oil feed passage 80. A high threshold value for the oil feel pressure is established by a relief valve 82, which communicates with the low pressure oil return passage 84 leading to the oil reservoir 78 from the engine 12.

The electric motor power for the electric motor oil pump 76 is distributed to a relay 86 under the control of the powertrain control module 70.

Figure 2:
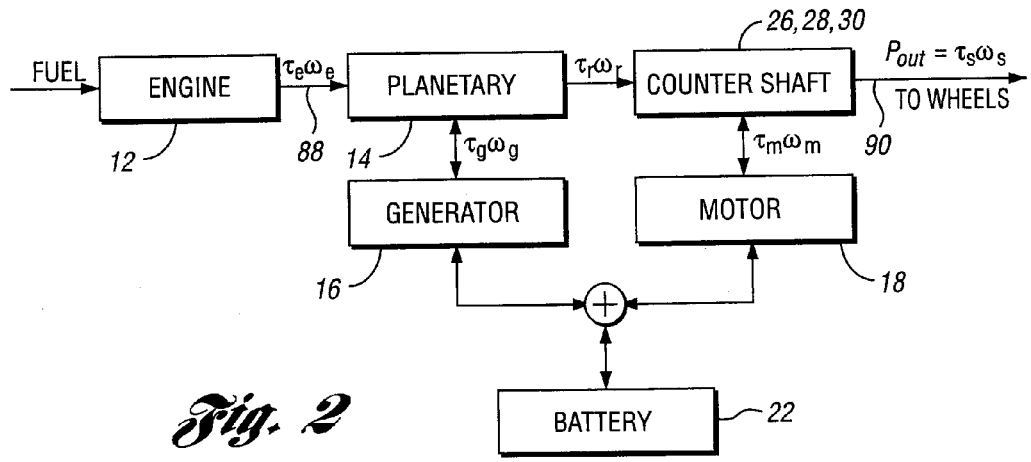
FIG. 2 is a schematic illustration of the components of the powertrain illustrated in FIG. 1, together with power flow vectors between the components.

It is apparent from FIG. 2 that the engine can be turned on or turned off depending upon the operating mode of the powertrain. In FIG. 2, engine power ($\tau_e \omega_e$) is delivered to the planetary gear unit 14 as shown at 88. During operation in a divided power delivery mode, the planetary will deliver power ($\tau_g \omega_g$) to generator 16. During a generator drive mode with the engine off, power is delivered in the reverse direction to the planetary gear unit 14.

During generator drive, the motor 18 can deliver power ($\tau_m \omega_m$) to the countershaft. The motor may also recover regenerative energy from the traction wheels to charge the battery 22. If the generator is braked, motor power using battery energy can drive the traction wheels in either a forward direction or a reverse direction.

Traction wheel power ($\tau_s \omega_s$) is indicated in FIG. 2 at 90.

When the battery state-of-charge is high, the vehicle may be driven using motor power only, and the engine may be turned off. The operating mode for the powertrain is under the control of the vehicle system controller, which controls and coordinates the two power sources in order to satisfy the driver's demand for power while optimizing the total powertrain system efficiency and performance. The vehicle system controller interprets the driver demand for power, indicated by the driver's selection, and the accelerator pedal position. It then determines when and how much torque each power source needs to provide in order to meet the driver's demand, and to achieve specific vehicle performance.

When the vehicle system controller commands the engine to be turned on following an operating mode in which electrical power only is used, the strategy of the invention will enable the electric motor oil pump to develop oil pressure in the engine lubrication system prior to ignition as engine cranking is initiated. Experimental data is used to determine the oil flow requirements that will minimize parasitic losses and to provide acceptable engine life. This data is used by the software strategy of the invention in an open loop fashion to command an electric oil pump motor torque that is sufficient to provide the precalibrated oil pressure throughout the entire engine speed range.

As the volume of oil pumped into the engine increases, the oil pressure increases. When a sufficiently high pressure is reached, the pressure relief valve 82 will open, thereby protecting the lubrication system from excessive pressure. The bypass valve need not be used, however, during normal high speed engine use because of the operating strategy, which will be described subsequently. Oil flow would be precisely metered at high engine speeds using the control strategy of the invention. Since bypassing of the oil back to the reservoir 78 is not needed, engine operating efficiency is improved.

If the engine includes camshafts that can be hydraulically pre-positioned using a variable camshaft timing feature, the engine oil pressure developed by the strategy of the invention can be used to pre-position the camshafts to reduce engine cranking torque and engine cranking time prior to ignition.

An example of an internal combustion engine with a variable camshaft timing feature is disclosed in SAE Paper 1999-01-0641 by Thomanek et al.

When the engine is cold, the high viscosity of the oil makes it difficult to pump oil into the engine oil galleries. The engine oil pressure relief valve will prevent excessive pressures from developing. When the oil is warm, the viscosity generally is low enough to keep the pressure relief valve closed.

Oil pressure is a function of oil viscosity and oil flow rate. This can be expressed as follows:

$$\Delta P \approx Q \times \mu,$$

where Q is a function of engine speed and oil flow rate.

The engine can be primed using electric motor oil pressure so that an optimal oil pressure is achieved before cranking the engine. This will reduce wear since most engine wear occurs during the initial engine cranking. A lubricating oil film is provided at this time. Further, as mentioned above, the development of engine oil pressure prior to engine cranking will reduce valve lash noise when the engine has hydraulic lash adjusters. When the engine is shut down, oil pressure in the lash adjusters can bleed down and lose oil pressure to the engine oil reservoir.

Figure 3:
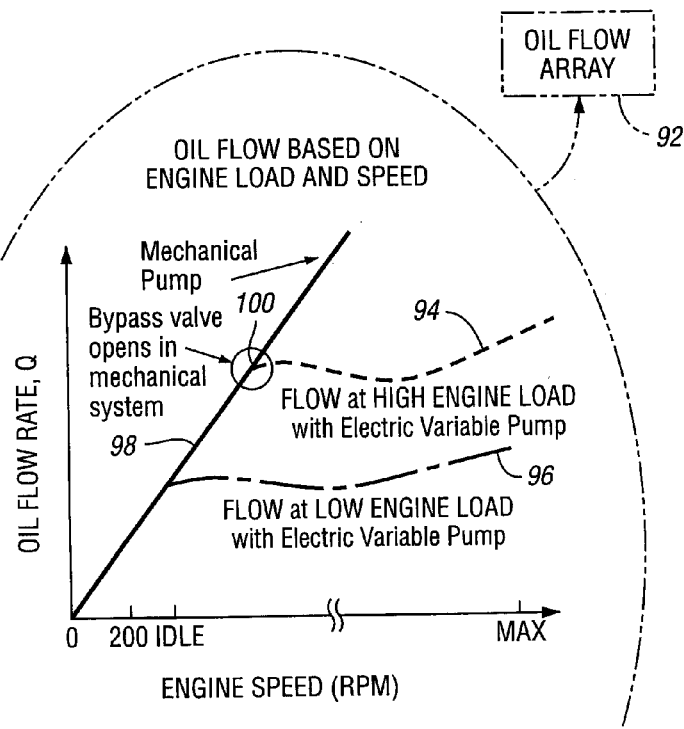
FIG. 3 is a plot showing the relationship between engine speed and oil flow rate, the plot residing in memory registers of the vehicle system controller of FIG. 1.

The engine oil temperature is calculated based on the engine torque, the engine speed, and the vehicle speed, as well as the amount of time the engine has been running. The calculated oil temperature is distributed to an oil flow array located in computer memory. The oil flow array is schematically indicated in FIG. 3 at 92. The array 92 is a three-dimensional array that also stores oil pressure. The strategy of the invention will use the information in the oil flow array to calculate the motor speed of the electric oil pump 76 so that an optimum oil flow is achieved. These optimum oil flow values are indicated in FIG. 3 at 94 and 96 in a plot of the relationship of oil flow rate to engine speed. A modifier, which is calculated based on preexisting data, is applied to the oil flow rate value, as indicated in FIG. 3. A lower plot and an upper plot for low engine load and torque and high engine load and torque is developed, as shown at 94 and 96, respectively.

In addition to the foregoing, the value of the electric motor oil pump pressure can be used in a system self test for engine oil and engine oil filter change intervals. An electric oil pump motor operating at a given speed requires a fixed amount of torque to pressurize the engine lubrication system.

As the engine oil filter 78 becomes clogged, more electric motor torque is required to overcome the resistance of the lubrication system to maintain the same speed. Once the engine has reached a steady-state operating temperature, the oil viscosity behaves in a linear manner; i.e., the relationship of engine oil viscosity and engine oil temperature in a two-dimensional plot would be essentially a straight line. With a constant oil flow rate, the pump pressure must increase as resistance to flow increases in order to maintain a constant flow at a certain maximum motor torque level, which can be calculated using electric motor current draw. A flag code is sent to the vehicle system controller when that current draw is reached, which will issue a signal to the vehicle instrument cluster display, shown in FIG. 1 at 116, to inform the driver that it is time to change the oil.

If the engine has a variable cam timing feature, the oil pressure developed by the electric oil pump 76 can adjust the cam to provide for late intake valve closing. This reduces the forces of the cylinder compressed gases, which reduces the forces transmitted to the vehicle's occupants. The ability to use electric oil pump pressure to control the variable camshaft timing feature can reduce undesirable exhaust gas emissions by precisely positioning the camshafts before the engine starts based on engine catalyst temperature.

Before the engine is started, the motor driven oil pump can provide oil pressure to the engine before the engine is cranked during engine start up, and the oil temperature at that time is at a desirable high level since the temperature during engine shut down can be maintained at a higher level due to the ability of the pump to maintain oil circulation during engine shut down.

Figure 3A:
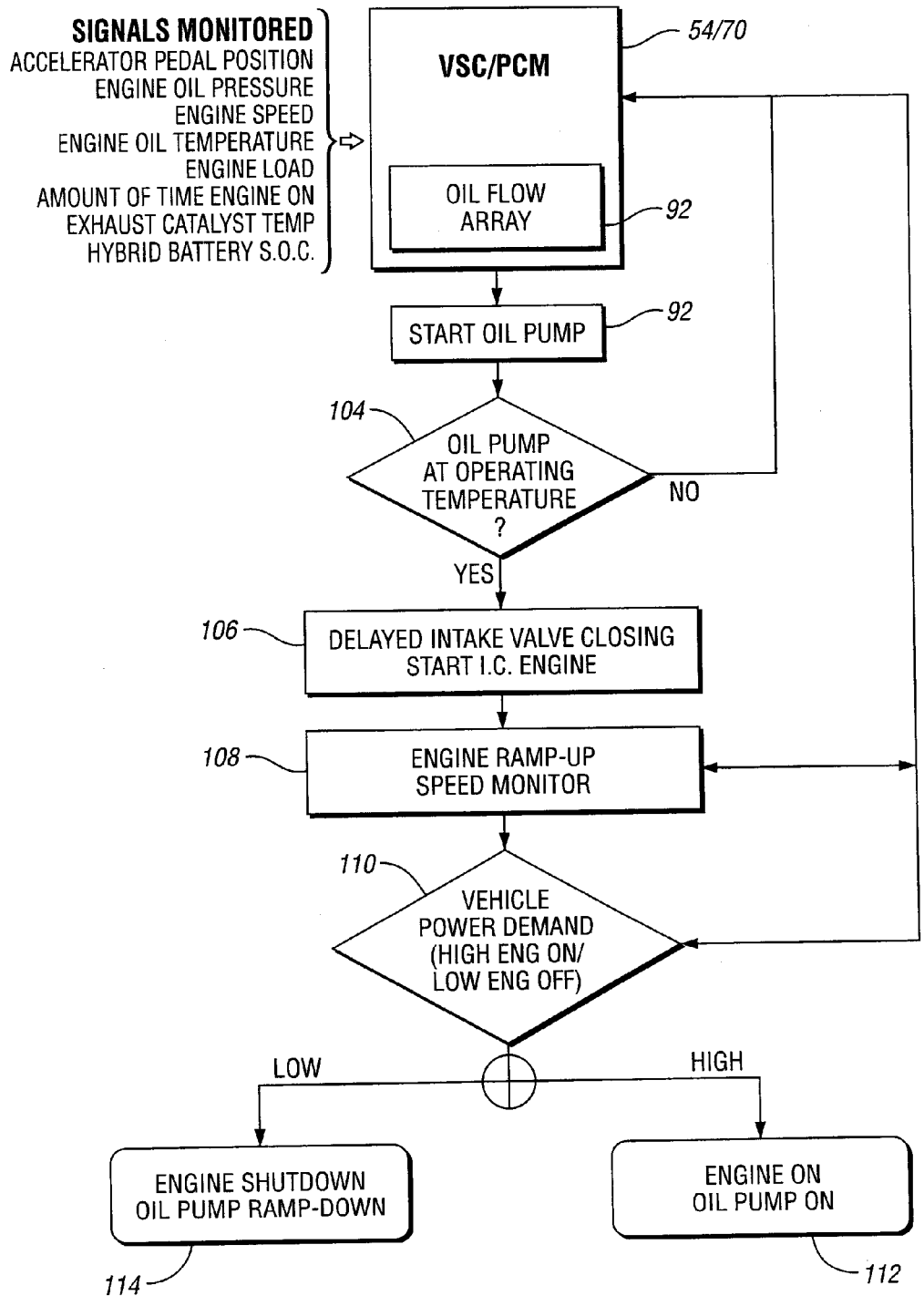
FIG. 3a is a flow diagram illustrating the software strategy used by the vehicle system controller of the powertrain illustrated in FIG. 1 for controlling the motor driven lubrication oil pump.

The control strategy for the invention is illustrated in flow diagram format in FIG. 3a. As seen in FIG. 3a, the vehicle system controller and the powertrain control module receive input data by monitoring accelerator pedal position, engine oil pressure, engine speed, engine oil temperature, engine load, the amount of time the engine is on, exhaust catalyst temperature, and hybrid battery state-of-charge. This information is stored in a read-only memory (ROM) portion of controller memory registers.

Included in the ROM memory is the information of the oil flow array illustrated in FIG. 3. This comprises a plot of oil flow rate versus engine speed for various temperature values. Temperature is one of the three variables in the plot of FIG. 3. The other two variables are indicated as engine speed and oil flow rate. The flow at high engine load, illustrated at 94, actually is a surface rather than a two-dimensional line; but for purposes of illustration, it is indicated as a linear plot because the third variable, temperature, is not indicated. Likewise, the flow at low engine load is plotted in FIG. 3 in two dimensions for various engine speeds. Actually, the plot 96 would be a three-dimensional surface since the third coordinate, i.e., temperature, is not illustrated in FIG. 3.

The so-called "modifier" previously described determines the separation between the plot shown at 94 and the plot shown at 96. This modifier is a calibrated value.

The straight line, shown at 98, illustrates the relationship between engine speed and oil flow rate for both a conventional engine driven mechanical lubrication oil pump for an internal combustion engine and the motor driven oil pump, shown at 76 in FIG. 1.

In the case of a mechanical system, a bypass valve will open at point 100, and lubricating oil would be bypassed back to the engine oil sump. This creates an undesirable power loss. In the case of the present invention, the oil flow would be metered at the appropriate rate, as indicated by the plot shown at 94 or by the plot shown at 96, depending upon the engine load.

If the vehicle system controller and the powertrain control module indicate that the engine is about to start, the oil pump is started at step 102 in FIG. 3a. The engine oil temperature is monitored, and it is determined at decision block 104 in FIG. 3a whether the oil pump is at its calibrated operating temperature. If it is not, the routine returns to the beginning. If the operating temperature is at its desired value, the variable camshaft timing is delayed and the engine is started at action block 106.

The engine is ramped up to the desired speed at action block 108 following the engine start.

At decision block 110, the vehicle power demand by the operator is determined. If the power demand is high, the engine oil pump remains on, as shown at 112. If the power demand is low, the vehicle system controller and the powertrain control module will shut down the engine and the oil pump pressure is ramped down, as shown at 114.

Although an embodiment of the invention has been disclosed, it will be apparent to persons skilled in the art that modifications may be made without departing from the scope of the invention defined by the following claims. All such modifications and equivalents thereof are included within the scope of the invention.

What is claimed is:

1. A hybrid electric vehicle powertrain comprising an engine and an electric vehicle traction motor defining in part separate power flow paths to vehicle traction wheels;

an engine lubrication oil pump in fluid communication with a lubrication oil flow circuit for the engine;
the lubrication oil pump having a lubrication oil pressure supply line communicating with the lubrication oil flow circuit for the engine;
an oil reservoir for the lubrication oil pump;
a low pressure lubrication oil return communicating with the lubrication oil pump;
an electric oil pump drive motor drivably connected to the lubrication oil pump; and
a powertrain control module and a vehicle system controller in electrical communication with the pump drive motor, the vehicle system controller being configured to develop engine power commands to the powertrain control module in response to system operating input variables and driver power demand whereby the engine is turned off during vehicle operation using solely traction motor power and the engine is turned on during a demand for engine power;
the powertrain control module being configured to start the pump drive motor during a transition from an engine-off state to an engine-on state whereby the lubrication oil flow circuit is pressurized prior to engine acceleration to its steady-state speed, the powertrain control module being configured also to command a modification of oil flow rate from the lubrication oil pump to the engine as a function of at least one engine operating variable, including engine speed, engine power demand and engine oil temperature.

2. The hybrid electric vehicle powertrain set forth in claim 1 wherein the lubrication oil flow circuit includes a lubrication oil flow reservoir, the lubrication oil pump having a low pressure lubrication oil flow inlet communicating with the lubrication oil flow reservoir.

3. The hybrid electric vehicle powertrain set forth in claim 2 wherein the engine has a dry oil sump communicating with the lubrication oil flow circuit.

4. The powertrain set forth in claim 1 wherein the powertrain comprises a high voltage traction battery electrically coupled to the electric oil pump drive motor through an electrical relay circuit.

5. The powertrain set forth in claim 1 wherein the engine includes intake and exhaust valves actuated by a camshaft, and a hydraulic pressure-operated variable camshaft timing system for adjusting valve timing, the pump being hydraulically connected to the camshaft timing system whereby the camshaft is adjusted at the outset of engine cranking during an engine start event.

6. A hybrid electric vehicle powertrain comprising an engine and an electric vehicle traction motor defining in part separate power flow paths to vehicle traction wheels;

an engine lubrication oil pump in fluid communication with a lubrication oil flow circuit for the engine;
an electric oil pump drive motor drivably connected to the lubrication oil pump;
a powertrain control module and a vehicle system controller in electrical communication with the pump drive motor, the vehicle system controller being configured to develop engine power commands to the powertrain control module in response to system operating input variables and driver power demand whereby the engine is turned off during vehicle operation using solely traction motor power and the engine is turned on during a demand for engine power;
the powertrain control module being configured to start the pump drive motor during a transition from an engine-off state to an engine-on state whereby the lubrication oil circuit is pressurized prior to engine acceleration to its steady-state speed, the powertrain control module being configured also to command a modification of oil flow rate from the lubrication oil pump to the engine as a function of at least one engine operating variable, including engine speed, engine power demand and engine oil temperature;

an engine lubrication oil filter in the lubrication oil flow circuit;

a sensor for determining engine oil pressure sensor; and a lubrication oil pressure display visible to a driver in communication with the powertrain control module whereby the driver is alerted by a signal generated by the powertrain controller to a need to change the lubrication oil filter as lubricating oil pressure on a flow inlet side of the oil filter is increased to a value exceeding a calibrated threshold level.

7. The hybrid electric vehicle powertrain set forth in claim 6 wherein the lubrication oil flow circuit includes a low pressure lubrication oil flow reservoir communicating with the engine lubrication oil pump.

8. The hybrid electric vehicle powertrain set forth in claim 7 wherein the engine has a dry oil sump communicating with the lubrication oil flow circuit.

9. A method for establishing lubrication oil pressure for an internal combustion engine in a hybrid electric vehicle powertrain having an electric traction motor in electrical communication with a traction battery for complementing engine driving power with electric traction motor power, an engine lubrication oil pump in an engine lubrication oil flow circuit and a lubrication oil pump drive motor; the method comprising the steps of:

measuring driver demand for power;

monitoring engine and vehicle operating variables including driver demand for power, engine speed, engine oil temperature and traction battery state-of-charge;

turning off the engine to effect an electric traction motor only drive mode in an operating mode when vehicle operating variables do not require engine power;

turning on the engine in an operating mode when vehicle operating variables require engine power;

turning on the lubrication pump drive motor during a transition from an engine-off operating mode to an engine-on operating mode whereby engine lubrication oil pressure is increased at the outset of engine cranking during an engine start; and controlling engine oil flow in the lubrication oil flow circuit throughout a range of engine speeds whereby lubrication oil flow requirements are satisfied by precisely metering oil flow without excess oil flow being developed at high engine speeds.

10. The method set forth in claim 9 whereby the step of controlling engine oil flow comprises metering oil flow at a first flow rate for a given engine speed when load on the engine is high and at a second flow rate, less than the first, when load on the engine is low.

11. The method set forth in claim 10 wherein oil flow rate is a function of lubrication oil temperature and lubrication oil pressure.

12. The method set forth in claim 9 wherein oil flow at a given engine speed is modified by a modifier relative to another flow rate at the given engine speed, the modifier being a calibrated value whereby lubrication oil flow at low engine loads for a given engine speed is less than lubrication oil flow at high engine loads at the given engine speed.

13. The method set forth in claim 12 wherein oil flow rate is a function of lubrication oil temperature and lubrication oil pressure.

14. The method set forth in claim 9 wherein the step of controlling engine oil flow includes:

maintaining lubrication oil flow from the oil pump through the engine lubrication oil flow circuit when the engine is turned off thereby maintaining engine oil temperature at a desired level.

15. The method set forth in claim 9 wherein the step of controlling engine oil flow includes monitoring lubrication oil flow resistance by detecting current draw by the oil pump drive motor, and developing a warning signal for a need to change an engine oil filter when current draw reaches a calibrated level.

* * * * *